Oct. 21, 1952  J. C. THORESEN  2,614,424
PNEUMATIC APPARATUS FOR MEASURING FLUID PRESSURE
Filed Sept. 1, 1945  2 SHEETS—SHEET 1

INVENTOR
JOHN C. THORESEN
BY E. C. Sanborn
ATTORNEY

Oct. 21, 1952  J. C. THORESEN  2,614,424
PNEUMATIC APPARATUS FOR MEASURING FLUID PRESSURE
Filed Sept. 1, 1945  2 SHEETS—SHEET 2

INVENTOR
JOHN C. THORESEN
BY E. C. Sanborn
ATTORNEY

Patented Oct. 21, 1952

2,614,424

UNITED STATES PATENT OFFICE 2,614,424

PNEUMATIC APPARATUS FOR MEASURING FLUID PRESSURE

John C. Thoresen, Warwick, R. I., assignor to Builders Iron Foundry, Providence, R. I., a corporation of Rhode Island Application September 1, 1945, Serial No. 614,042

5 Claims. (Cl. 73—213)

1

This invention relates to the measurement of values of a variable condition and more particularly to pneumatic apparatus for measuring variable magnitudes and transmitting the values thereof to a desired point.

An object of the invention is the provision of a novel pneumatic meter of relatively simple construction for the efficient measurement and transmission of variable values.

The invention provides more specifically a novel measuring apparatus wherein forces corresponding to variations in the magnitude of a condition are applied to an arm of a lever system and are balanced by variations in force applied to another arm of the system, which latter variations are in turn communicated to a measuring instrument at any desired point for indicating the values of the condition under measurement.

Another feature of the invention resides in novel provisions for the measurement of the rate of flow of a fluid in response to a differential pressure varying as the square of said flow rate. In that connection, the invention provides means for creating, in response to said differential pressure, an air pressure having a linear relation to the rate of flow of said fluid.

Other features of the invention will be hereinafter described and claimed.

Figure 1:
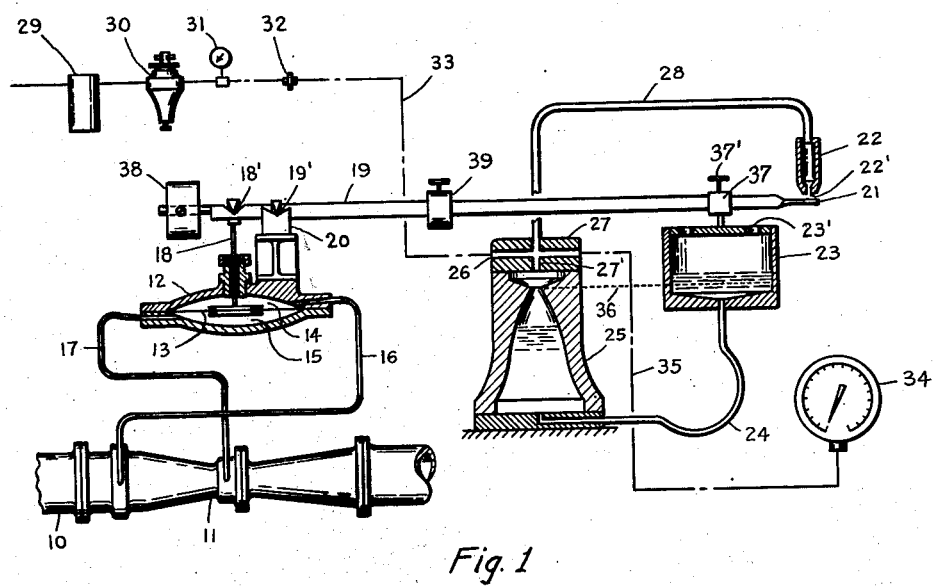
Fig. 1 is a diagrammatic view illustrating an embodiment of the invention applied to the telemetering of the rate of flow of a liquid.

Referring to the drawings, there is shown in Fig. 1 a conduit 10 having a Venturi section 11 for the passage of a liquid whose flow rate is to be measured.

Mounted in a housing 12 is a flexible diaphragm 13, which divides the interior of said housing 12 into chambers 14 and 15. The latter are connected to high and low pressure points in the Venturi section by the respective conduits 16 and 17. A stem 18, attached to the diaphragm 13, extends through a suitable bearing in the housing 12 and is connected at its upper end to a lever 19 fulcrumed upon a support 20. The lever 19 may conveniently be notched to receive a knife edge bearing 18' at the upper end of said stem 18, while the support 20 may also be notched for

2 receiving knife-edge bearing means 19' on the lever 19.

At its opposite end the lever 19 is flattened to provide a vane portion 21 which lies in proximity to a port 22' for the emergence of air through a bleeder nozzle 22. Suspended from said lever 19 at a point between the fulcrum 19' and vane portion 21 is a well 23, which is connected by a flexible tubing 24 with a stationary well 25. Said wells 23 and 25 contain mercury or other suitable manometric liquid.

Air under pressure is supplied to a passage 26 in a manifold 27 shown above the stationary well 25; which passage 26 communicates with said well through a channel 27', and with the bleeder nozzle 22 through conduit 28. The air may be supplied to said manifold through apparatus of well-known type comprising a filter and moisture trap 29, pressure reducing valve 30, pressure gauge 31, pinhole orifice 32, and conduit 33. A pressure gauge 34, which may be of conventional construction, is also connected to the passage 26 by a suitable conduit 35. The conduits 33 and 35 may, if desired, extend through very substantial distances from the manifold 27 and are hence indicated by broken lines.

The upper portion of the well 23 is in communication with the atmosphere through suitable openings 23'.

When no fluid is flowing through the conduit 10, no differential pressure is applied to the diaphragm 13. At that time the mercury in the wells 23 and 25 is at a common level, indicated by the dotted line 36. Under that condition, the weight of the liquid in the well 23 acts upon the lever 19 so that the vane 21 is in its lowermost position beneath the air escape port 22'. The pin hole orifice is of such small diameter with respect to that of the port 22' that when said vane 21 is in said lowermost position the pressure in the manifold system is practically zero. For example, a diameter of about .010" of said pin hole orifice has been found suitable when the diameter of the port 22' is .04"; but these dimensions are not critical.

As liquid flows through the conduit 10 a differential pressure is applied to the diaphragm 13, forcing said diaphragm downwardly and thereby exerting a downward pull upon the lever arm to the left of the fulcrum 19'. The vane 21 is thus moved upwardly toward the port 22', obstructing the flow of air therethrough, with consequent building up of pressure in the manifold 27. This pressure acts downwardly upon the mercury in the well 25 and forces mercury therefrom into the well 23, thus increasing the weight of mercury in the latter well and developing a moment of force about the fulcrum 19' which tends to lower said vane 21. Mercury continues to flow from the stationary well 25 into the suspended well 23 until the last mentioned moment equals the moment of force applied to said lever about said fulcrum by the aforementioned differential pressure. At that time the lever system is balanced. The air pressure required to continue the balance is maintained in the manifold system and is indicated by the pressure gauge 34.

It will be noted that the moment which counteracts the effect of variations in differential pressure upon the lever 19 is itself varied simply by change in the amount of liquid in the well 23, without change in the distance from the fulcrum 19' to the point of suspension of said well. Rebalancing of the lever system is thus obtained without variation in the length of the effective lever arm.

Because of the Venturi law, the pressure differential created across the diaphragm 13 varies as the square of the rate of flow of the liquid in the conduit 10. Hence, the pull on the diaphragm, and the corresponding moment $M_1$ applied by stem 18 to the lever 19 will vary as the square of the rate of flow. The stationary well 25 is so shaped that the volume of liquid displaced into the floating well 23 will vary as the square of the total pressure required in the manifold to maintain balance. As a result, the moment $M_2$ exerted upon the lever by the liquid forced into the well 23 will vary as the square of the air pressure in the manifold 27. At a state of balance, the moments $M_1$ and $M_2$ are equal, and it will hence be apparent that the manifold pressure varies linearly in correspondence with the rate of flow of the liquid through the conduit 10 and Venturi section 11. The readings of the gauge 34 thus are proportional to said rate of flow.

In other words, the moment $M_1 = DAa$, where D is the differential pressure, A is the effective area of the diaphragm, and $a$ is the distance between points 18' and 19'. The moment $M_2 = Wb$; where W is the weight of liquid in the well 23 in excess of that in said well when the air pressure in the manifold 27 is substantially zero, and $b$ is the distance from fulcrum 19' to the point of suspension of said well. When $M_1 = M_2$, (1) $$DAa = Wb$$

As above noted, D is proportional to the square of the flow rate (V), while W is proportional to the square of the air pressure (P) necessary to effect balancing of the lever system. Hence $D = CV^2$, and
$W = C'P^2$, where C and C' are constants Substituting these values of D and W in the above noted equation (1), there results (2) $$V^2 CAa = P^2 C'b$$

Since C, A, $a$, C', and $b$ are constants, it is apparent that $V^2$ is proportional to $P^2$ and that V varies as P, so that the air pressure necessary to maintain balance varies linearly as the flow rate under measurement.

The floating well 23 may, if desired, be adjustably mounted on the lever 19, as through a sleeve 37 provided with a set screw 37' for fastening the sleeve 37 and well 23 in any position of adjustment. Thus the moment $M_2$ may be varied for any given maximum pressure in the manifold by moving the point of support of said floating well toward or away from the fulcrum 19'. Thereby the range of measurement may be varied as desired.

The lever 19 may also, as shown, be provided with adjustable balancing weights 38 and 39. Weight 39 has two functions: (a) as a vernier to weight 38 in the initial adjustment of zero balance, and (b) as a compensating weight to maintain balance when the well 23 is moved along the lever 19.

Figure 2:
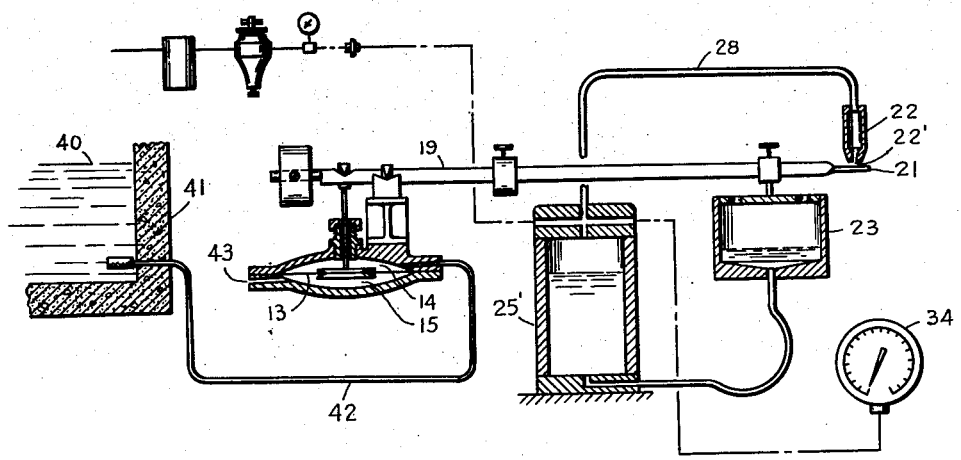
Fig. 2 shows an embodiment of the invention for telemetering the level of a liquid.

In Fig. 2 apparatus embodying my invention is shown applied to the measurement of the level of a liquid 40 in a tank 41. The apparatus is the same as that of Fig. 1 except that the upper diaphragm chamber 14 is in communication with the bottom portion of tank 41 through a pipe 42, while the chamber 15 is open to atmosphere through opening 43. Also the stationary well 25' is straight-sided, so that there is a linear relation between the output air pressure and the amount of liquid displaced from said well 25' to the floating well 23. And since the force applied to the lever 19 through the diaphragm 13 is proportional to the level of the liquid in the tank 41, it will be apparent that the air pressure necessary to maintain balance is also proportional to said level.

Figure 3:
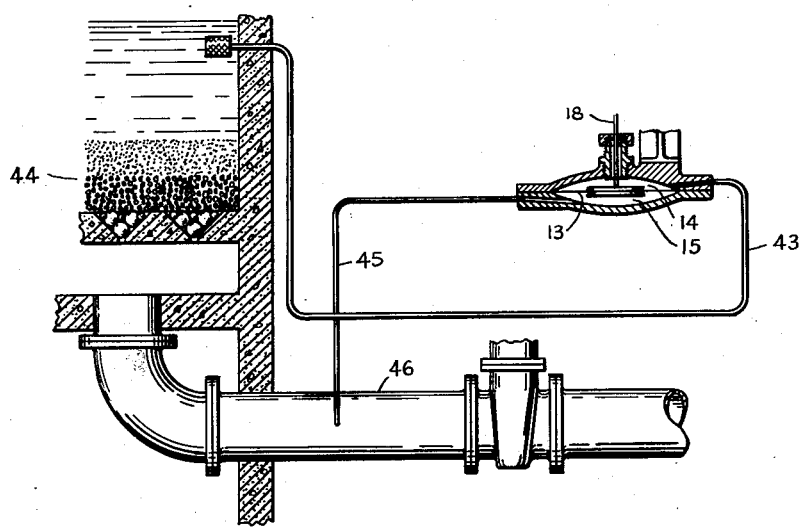
Fig. 3 shows an embodiment of the invention applied to the telemetering of the loss of head of a liquid due to passage through a given medium.

In Fig. 3, the apparatus is the same as in Fig. 2, except that the diaphragm chamber 14 is connected by conduit 43 to liquid above a filter bed 44, while the diaphragm chamber 15 is connected by conduit 45 to liquid in the pipe 46 below said filter bed. Thus the diaphragm 13 is subjected to a differential pressure which varies linearly as the loss of head in the filter bed and the air pressure necessary to effect balance of the lever system likewise varies linearly as said loss of head.

Figure 4:
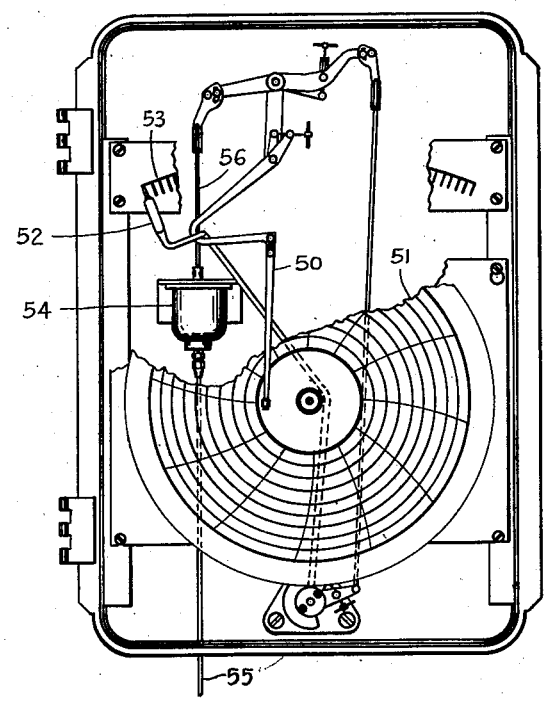
Fig. 4 is a view in front elevation of apparatus for recording the telemetered values.

In all of the embodiments above described, it will be apparent that the gauge 34 which measures the balancing air pressure may be graduated in suitable units for indicating the values of the condition to which said air pressure is proportional. Where a record of said condition, or totalization of its values, is desired, the pressure gauge 34 may be replaced by apparatus of well-known type for accomplishing such results. Such apparatus may, for example, be of the form manufactured by applicant's assignee and sold under the trade-mark Flo-Watch, which apparatus is illustrated in publications of said assignee, such as Bulletins Nos. 284 and 318B, published in 1936 and 1944, respectively. Such apparatus, which is in substantial use, is indicated in Fig. 4 of the present application, including a pen arm 50 for recording values of a variable condition on a chart 51, and a pointer 52 for indicating said values on a scale 53. A bellows 54 responds to air pressure received through conduit 55 from the manifold 27 to operate a link 56 and thereby to transmit movement to said pen arm and pointer, so that the latter are operated to different positions, just as they are actuated by a rate cam in the standard Flo-Watch. Operation of a totalizing mechanism (not shown) which forms part of said Flo-Watch is also effected through parts connected to the operating means for said pen arm in the same manner as in the standard instrument.

The terms and expressions which I have employed are used as terms of description and not of limitation, and I have no intention in the use of such terms and expressions, of excluding any equivalents of the features shown and described or portions thereof, but recognize that various modifications are possible within the scope of the invention claimed.

I claim:

1. Apparatus for measuring a variable magnitude, said apparatus comprising a lever, means for applying to said lever a force variable with changes in said magnitude, a receptacle adapted to contain a quantity of liquid and supported pendently by said lever for applying the weight of said liquid to said lever in opposition to the first-mentioned force, a reservoir for a liquid, flexible liquid-conduit means connecting said reservoir with said receptacle, and pressure means comprising a conduit and a nozzle having an outlet port connected to said conduit, means movable with said lever in response to variations in said force for variably obstructing passage of fluid through said port, and means connecting said conduit with said reservoir to subject the liquid therein to varying pressures in response to movement of said obstructing means to thereby effect balancing of said lever through variation in the weight of liquid in said receptacle.

2. Apparatus for measuring a variable magnitude, said apparatus comprising a lever, means for applying to said lever a force variable with changes in said magnitude, a receptacle adapted to contain a quantity of liquid and supported pendently by said lever for applying the weight of said liquid to said lever in opposition to the first-mentioned force, a reservoir for a liquid, flexible liquid-conduit means connecting said reservoir with said receptacle, and pressure means comprising a conduit and a nozzle having an outlet port connected to said conduit, means movable with said lever in response to variations in said force for variably obstructing passage of fluid through said port, means connecting said conduit with said reservoir to subject the liquid therein to varying pressures in response to movement of said obstructing means to thereby effect balancing of said lever through variation of the weight of liquid in said receptacle, said connecting means having a passage adapted for connection to a measuring means for obtaining a measurement of the fluid pressure required for balancing of said lever.

3. Apparatus for measuring the rate of flow of a liquid, said apparatus comprising a lever, means for applying to said lever a force corresponding with values of a differential pressure varying as the square of said flow rate, a receptacle adapted to contain a quantity of liquid and supported pendently by said lever for applying the weight of said liquid thereto in opposition to said force, a reservoir for a liquid, flexible conduit means connecting said reservoir and said receptacle, and fluid pressure means responsive to changes in said differential pressure for applying pressure to the liquid in said reservoir for effecting flow of liquid from said reservoir to said receptacle for balancing said lever while the effective moment arm of said weight remains substantially unchanged, said reservoir being so shaped that the amount of liquid passing therefrom to said receptacle varies as the square of the pressure applied to said liquid in said reservoir.

4. Apparatus for transmitting to a desired point a fluid pressure varying linearly as the rate of flow of a liquid, said apparatus comprising a lever, means for applying to said lever a force varying as the square of said flow rate, a liquid-containing fluid pressure chamber, means responsive to movement of said lever under variations in said force for varying the fluid pressure in said chamber, a receptacle supported pendently by said lever and secured thereto for maintaining a substantially fixed moment arm regardless of variations in said flow rate, means for transferring liquid from said chamber to said receptacle under the influence of the fluid pressure in said chamber for applying a corresponding force to said lever through a substantially unchanging moment arm, said chamber being so shaped that the amount of liquid transferred therefrom to said receptacle varies as the square of said fluid pressure, and pressure-responsive measuring means connected to said chamber.

5. Apparatus for measuring the rate of flow of a liquid, said apparatus comprising a lever, means for applying to said lever a force varying as the square of said flow rate, a fluid pressure chamber, means responsive to movement of said lever under variations in said force for varying the fluid pressure in said chamber, a liquid reservoir including said chamber and having an outlet opening, said reservoir being so shaped that liquid passes through said opening in amounts proportional to the square of the fluid pressure in said chamber, and a receptacle in communication with said outlet opening for receiving liquid therefrom and supported pendently by said lever for balancing the latter through a substantially unchanging moment arm.

JOHN C. THORESEN.

REFERENCES CITED

The following references are of record in the file of this patent:

UNITED STATES PATENTS

| Number | Name | Date |
| --- | --- | --- |
| 1,191,415 | Gibson | July 18, 1916 |
| 1,585,170 | Roucka | May 18, 1926 |
| 1,638,100 | Roucka | Aug. 9, 1927 |
| 1,638,101 | Roucka | Aug. 9, 1927 |
| 1,878,179 | Rawling | Sept. 20, 1932 |
| 1,972,054 | Moller | Aug. 28, 1934 |
| 2,217,642 | Luhrs | Oct. 8, 1940 |
| 2,257,577 | Rosenberger | Sept. 30, 1941 |
| 2,325,714 | Stover | Aug. 3, 1943 |
| 2,354,423 | Rosenberger | July 25, 1944 |
| 2,371,253 | Moore | Mar. 13, 1945 |
| 2,380,177 | Hicks | July 10, 1945 |